(12) United States Patent
Liao

(10) Patent No.: US 8,592,073 B2
(45) Date of Patent: *Nov. 26, 2013

(54) FLAT-PLATE BATTERY

(75) Inventor: Chungpin Liao, Taichung (TW)

(73) Assignee: Innot Bioenergy Holding Co., George Town (KY)

( * ) Notice: Subject to any disclaimer, the term of this patent is extended or adjusted under 35 U.S.C. 154(b) by 265 days.

This patent is subject to a terminal disclaimer.

(21) Appl. No.: 13/076,287

(22) Filed: Mar. 30, 2011

(65) Prior Publication Data

US 2012/0148905 A1    Jun. 14, 2012

(30) Foreign Application Priority Data

Dec. 13, 2010 (CN) .......................... 2010 1 0585569

(51) Int. Cl.
*H01M 2/16* (2006.01)
(52) U.S. Cl.
USPC ........................ 429/144; 429/249; 429/162
(58) Field of Classification Search
None
See application file for complete search history.

(56) References Cited

U.S. PATENT DOCUMENTS

| 6,511,774 | B1 | 1/2003 | Tsukuda et al. | |
|---|---|---|---|---|
| 6,905,798 | B2 | 6/2005 | Tsukuda et al. | |
| 7,405,172 | B2 | 7/2008 | Shigematsu et al. | |
| 7,438,989 | B2 * | 10/2008 | Watanabe | 429/163 |
| 8,399,126 | B2 * | 3/2013 | Matsui et al. | 429/199 |
| 2004/0234862 | A1 * | 11/2004 | Macglashan et al. | 429/247 |
| 2009/0173582 | A1 * | 7/2009 | Ogg | 187/290 |
| 2009/0280408 | A1 * | 11/2009 | Valkiainen et al. | 429/212 |
| 2009/0325067 | A1 * | 12/2009 | Liao et al. | 429/213 |

OTHER PUBLICATIONS

Clean Technica article, "World's First Chlorophyll Organic Battery Runs on Any Liquid", Oct. 31, 2008 (www.cleantechnica.com).*
www.thefreedictionary.com entries for chlorophyll.*
D.B. MacDougall, Colour in food: Improving quality, Woodhead Publishing Limited and CRC Press LLC, 2002, pp. 193 and 261.*

* cited by examiner

*Primary Examiner* — Milton I Cano
*Assistant Examiner* — Carmen Lyles-Irving
(74) *Attorney, Agent, or Firm* — Morris Manning & Martin LLP; Tim Tingkang Xia, Esq.

(57) ABSTRACT

A flat-plate battery is provided in the present invention. The flat-plate battery includes a negative-electrode layer, a first separator, a chlorophyll layer, a second separator, a positive-electrode layer, an upper plate and a lower plate. The negative-electrode layer, the first separator, the chlorophyll layer, the second separator and the positive-electrode layer are stacked together in sequence, and then are sandwiched between the upper plate and the lower plate. The flat-plate battery of the present invention can store hydrogen by the chlorophyll of the chlorophyll layer to generate electricity. Thus, the manufacturing process of the flat-plate battery is simple and economical, and only natural and non-toxic substances are used. Unlike the manufacturing process of conventional batteries, the manufacturing process of the flat-plate battery of the present invention will not cause environmental pollution even when the battery is discarded after use.

20 Claims, 3 Drawing Sheets

FLAT-PLATE BATTERY

CROSS-REFERENCE TO RELATED APPLICATION

This application claims priority of Chinese Patent Application No. 201010585569.0, filed on Dec. 13, 2010, entitled "Flat-Plate Battery" by Chungpin Liao, the disclosure of which is incorporated herein by reference in its entirety.

FIELD OF THE INVENTION

The present invention relates to a flat-plate battery, and more particularly to a flat-plate battery using chlorophyll to generate electricity and a method for manufacturing of the flat-plat battery.

BACKGROUND OF THE INVENTION

In recent years, portable electronic devices, such as mobile phones, portable cameras, notebook computers, digital cameras, personal digital assistants (PDAs), CD players, are becoming popular owing to their lightweight and small size. Batteries used as a portable power source have also become the focus of public concern, and have been an essential element of the various portable electronic devices.

Although some of common batteries, such as carbon-zinc batteries, alkaline batteries and secondary batteries, are allegedly environment-benign, they in fact largely contain substantial amounts of mercury and other heavy metals, such as cobalt. In addition, environmental pollutants are frequently used or released during battery manufacturing process.

Lithium batteries, though widely adopted as the largest energy content among the portable batteries, are unstable in the electrochemical reactions. In the worst scenario, explosions may occur due to its thermal runaway as the result of operating at low load or under improper assemblage. Therefore, multiple and complex protection mechanisms should be implemented for their usage, such as the installation of a protection circuit, an exhaust vent, and isolation membranes, etc.

The price of the lithium batteries rises rapidly as a result of the depletion of lithium mineral, which is the main raw material of the positive electrode (such as $Li_{1-x}CoO_2$) and the negative electrode (such as $Li_xC$) of lithium batteries. Furthermore, the performance and operating life of the lithium batteries decrease rapidly within a high temperature environment.

Therefore, an unaddressed need for a flat-plate battery using chlorophyll to generate electricity exists in the art to address the aforementioned deficiencies and inadequacies.

SUMMARY OF THE INVENTION

The present invention relates to a flat-plate battery using chlorophyll to generate electricity that avoids the problems encountered during the manufacturing process of conventional batteries. The advantages of the present invention will be understood more readily after a consideration of the drawings and the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Reference will now be made to the drawings to describe an exemplary embodiment in detail.

Figure 1:
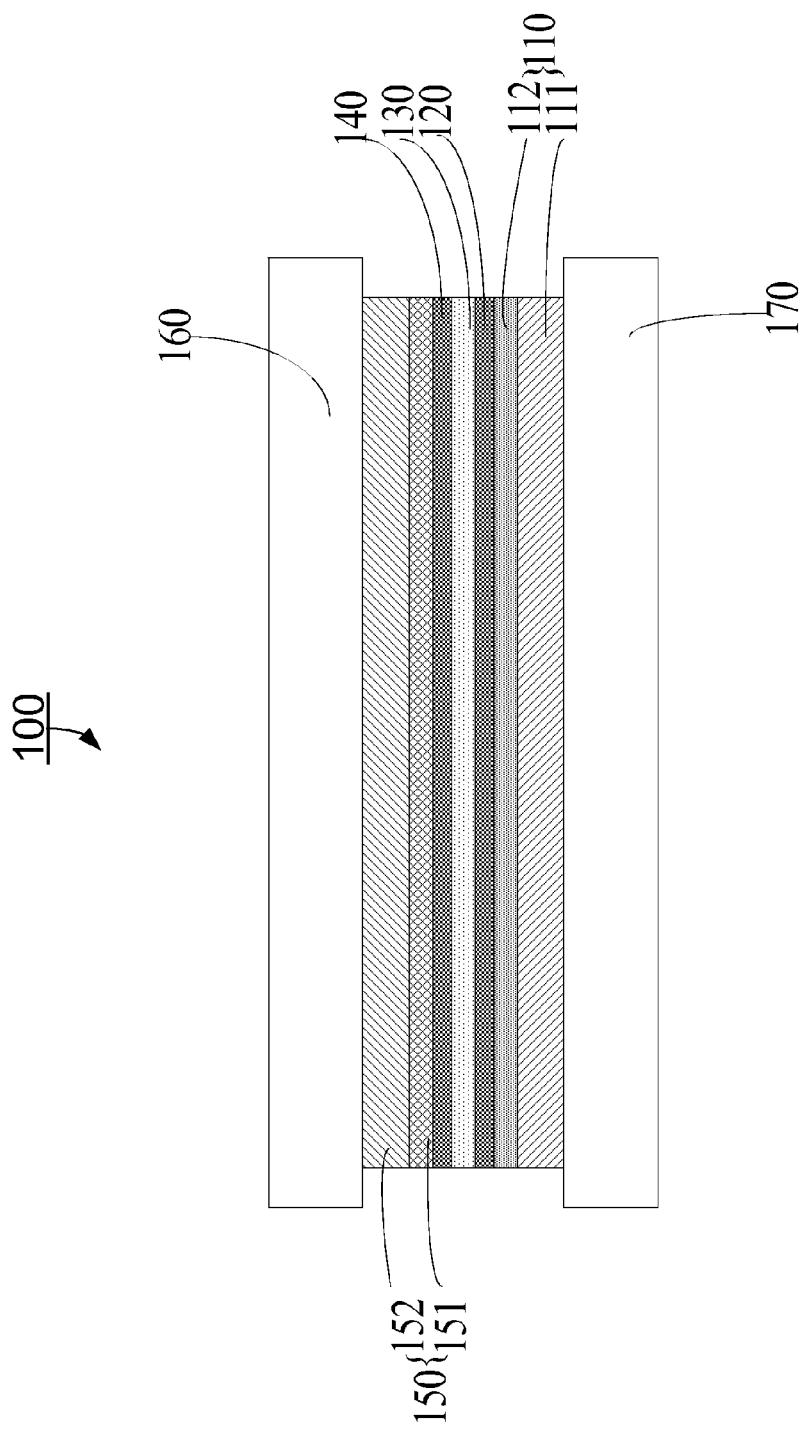
FIG. 1 is a sectional view of a flat-plate battery according to an exemplary embodiment of the present invention.

FIG. 1 is a schematic view of a flat-plate battery 100 according to an exemplary embodiment of the present invention. As shown in FIG. 1, the flat-plate battery 100 of the exemplary embodiment has a negative-electrode layer 110, a first separator 120, a chlorophyll layer 130, a second separator 140, a positive-electrode layer 150, an upper plate 160 and a lower plate 170. The first separator 120 is coated on the negative-electrode layer 110, the chlorophyll layer 130 is coated on the first separator 120, the second separator 140 is coated on the chlorophyll layer 130, and the positive-electrode layer 150 is coated on the second separator 140. That is, the negative-electrode layer 110, the first separator 120, the chlorophyll layer 130, the second separator 140 and the positive-electrode layer 150 are stacked together in sequence, and they are sandwiched between the upper plate 160 and the lower plate 170 to form the flat-plate battery 100.

The negative-electrode layer 110 has a conductive layer 111 and a metal-powder layer 112, and the metal-powder layer 112 is formed on the conductive layer 111. The conductive layer 111 is made of conductive material. The conductive material can be metal, metallic compound, or conductive polymeric material. The metal is selected from the group consisting of aluminum and gold. The metallic compound is selected from the group consisting of manganese protoxide, zinc oxide and magnesium oxide. The conductive polymeric material is heterocycle or aromatic heterocyclic compound. Preferably, the conductive polymeric material is selected from the group consisting of polyacetylene, poly (arylene vinylene), polythiophene, polyaniline, polypyrrole and the derivatives thereof. In addition, the conductive layer 111 have a rough surface (not marked) formed by a polishing process. Preferably, the conductive layer 111 is made of aluminum in one embodiment.

The metal-powder layer 112 contains metal powder. The metal power is uniformly sprayed on the conductive layer 111 to form an individual material layer. The metal powder is configured for enhancing the electric conductivity of the negative-electrode layer 110. The metal powder is elements selected from the group consisting of group II elements, group III elements and group VII elements. The group II elements are selected from the group consisting of magnesium, calcium and zinc. The group III elements are selected from the group consisting of boron and aluminum. The group VII elements are selected from the group consisting of manganese and ferrum. The weight of the metal powder is within a range of about 0.5 g to about 12 g. Preferably, the weight of the metal powder is 4 g in one embodiment.

Furthermore, it should be understood for a person skilled in the art that, the negative-electrode layer can only have the conductive layer 111 without the metal-powder layer 112 for enhancing the electric conductivity of the negative-electrode layer 110.

The first separator 120 and the second separator 140 are both made of high-fiber material. The high-fiber material can be paper material, such as cellophane, cotton paper, rice paper or silk paper, etc. Furthermore, the high-fiber material has pores existing therein, and the diametric length of each pores is preferably about 0.01 μm to about 1cm. Furthermore, the first separator 120 and the second separator 140 absorb a solution of organic salt, and the electric conductivity of the solution of organic salt is about 10 ms/cm to about 500 ms/cm. The organic salt can be organic salt without lithium, and it is selected from the group consisting of sodium iodide, sodium chloride and sodium hydroxide.

The chlorophyll layer 130 is substantially made of chlorophyll, and the chlorophyll is selected from the group consisting of chlorophyll a, chlorophyll b, chlorophyll c1, chlorophyll c2, chlorophyll d, and chlorophyll e. Typically, the chlorophyll, from which the chlorophyll oxidase have been removed, is in powder form or in liquid form.

In addition, the chlorophyll layer 130 can also be made by mixing the chlorophyll and a high polymer solution. For example, the chlorophyll in powder form and the high polymer solution are blended according to a predetermined ratio, then the chlorophyll is coated to form a layer, and finally the chlorophyll is baked to form the chlorophyll layer 130.

The electric conductivity of the high polymer solution is within a range of about 50 ms/cm to about 250 ms/cm. The high polymer solution includes elements selected from the group consisting of boron, magnesium, aluminum, calcium, manganese and zinc. The high polymer solution is further configured for adjusting the work function of the chlorophyll layer 130, so as to achieve the desired potential difference, such as 1.5V, between the positive-electrode layer and the negative-electrode layer of the flat-plate battery 100.

In one embodiment, the high polymer solution is prepared from a compound of metal ions and acid ions, high polymer and solvent in a predetermined proportion. The high polymer can be high polymer of glucose. The high polymer of glucose can be plant starch, such as potato starch, water chestnut starch, corn starch, sweet potato starch, lotus root starch, mustard powder, and pueraria powder, etc. The compound of metal ions and acid ions can be calcium carbonate. Alternatively, the compound of metal ions and acid ions can be natural phytochemicals, including lignans, oligosaccharides, polysaccharides, flavonoids, iridoids, fatty acids, scopoletin, catechin, beta-sitosterol, damnacanthal, and alkaloids. The solvent can have a polarity and a PH value greater than 3, such as water, seawater, tea, coffee, fruit juice or liquor, etc. The PH value of the high polymer solution is about 5.5 to about 8. The high polymer solution can further contain vitamin, such as vitamin D.

The positive-electrode layer 150 has an activated conductive polymeric layer 151 and a conductive polymeric layer 152. In one embodiment, the activated conductive polymeric layer 151 is made of carbon fiber cloth, carbon powder or nano conductive polymeric powder. The carbon fiber cloth or the carbon powder is selected from the group consisting of hard charcoal (or called chaoite), soot carbon, carbon black, glassy carbon, carbon nanotube, activated carbon, diamond, amorphous carbon, Graphene, fullerene, graphite, carbyne, diatomic carbon, tricarbon, atomic carbon, graphitization carbon, Pyrolytic carbon, coke, or other allotropes of carbon. The material of the conductive polymeric powder is heterocycle or aromatic heterocyclic compound. Preferably, the material of the conductive polymeric powder is selected from the group consisting of polyacetylene, poly (arylene vinylene), polythiophene, polyaniline, polypyrrole and the derivatives thereof.

In addition, the activated conductive polymeric layer 151 further contains chlorophyll in powder form, to enhance the electric-supplying capability of the flat-plate battery 100.

The upper plate 160 and the lower plate 170 are selected from the group consisting of acrylic plates, composite plates, metal plates (such as ferrum, tin, cooper, etc.), electric glass plates, metal-oxidation plates, and alloy plates.

In the exemplary embodiment, when the flat-plate battery 100 operates, the chlorophyll of the chlorophyll layer 130 and/or the chlorophyll of the positive-electrode layer generate electrons or holes as they receive light or touch the electrolyte solution, such that a potential difference occurs between the positive-electrode layer 150 and the negative-electrode layer 110 of the flat-plate battery 100 to supply a continuous current. In other words, the flat-plate battery 100 of the present invention uses chlorophyll of the chlorophyll layer 130 and/or chlorophyll of the positive-electrode structure 150 as the energy source to supply the electrical energy.

Figure 2:
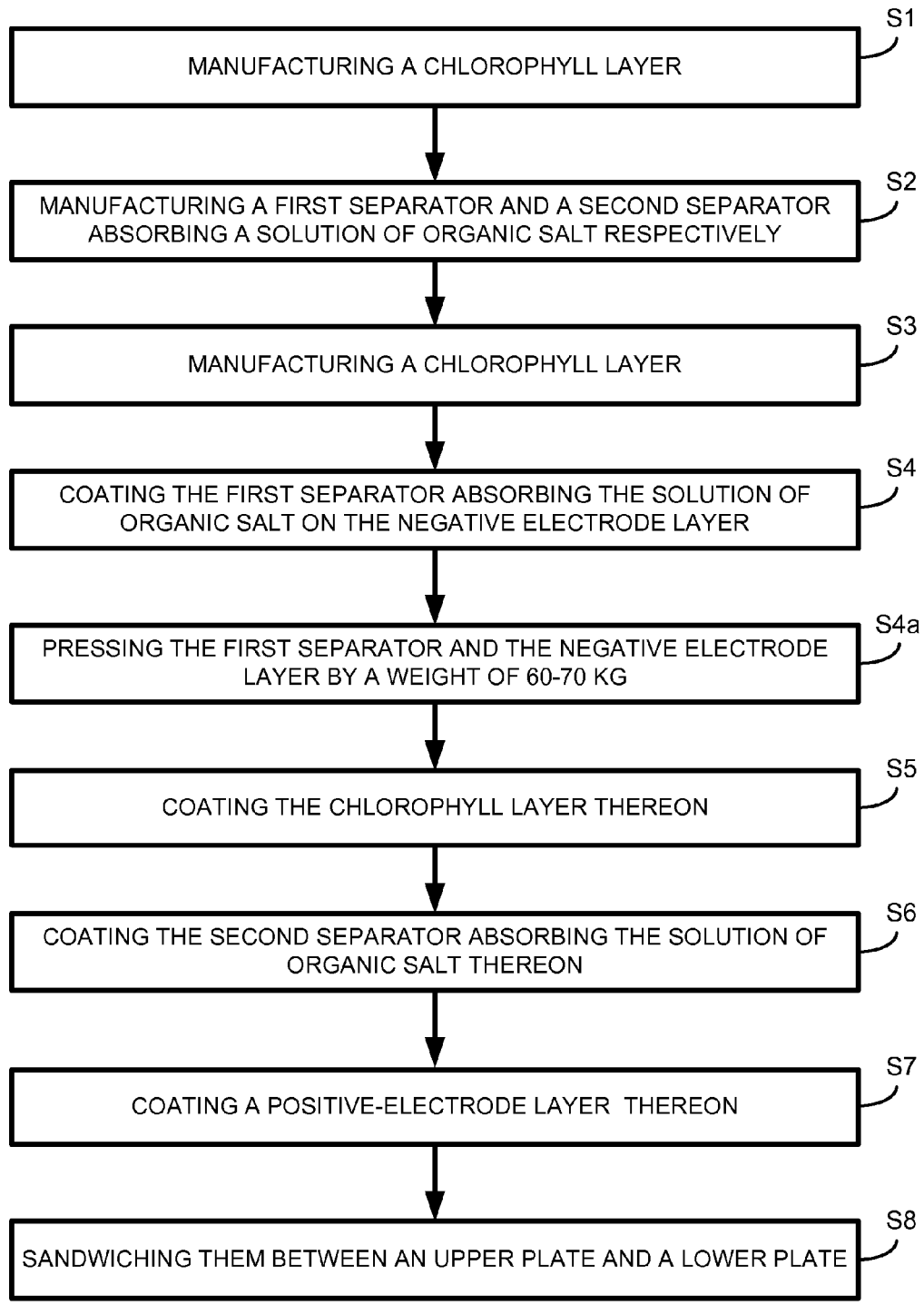
FIG. 2 is a flow chart of a method for manufacturing a flat-plate battery according to an exemplary embodiment of the present invention.

FIG. 2 is a flow chart of a method for manufacturing the flat-plate battery 100 according to an exemplary embodiment of the present invention. In FIG. 2, the manufacturing method includes following steps:

Step S1: providing a chlorophyll layer 130;
Step S2: providing a first separator 120 and a second separator 140 absorbing a solution of organic salt;
Step S3: providing a negative-electrode layer 110;
Step S4: coating the first separator 120 absorbed the solution of organic salt on the negative-electrode layer 110;
Step S5: coating the chlorophyll layer 130 thereon;
Step S6: coating the second separator 140 absorbed the solution of organic salt thereon;
Step S7: coating a positive-electrode layer 150 thereon; and
Step S8: sandwiching the chlorophyll layer 130, the first separator 120, the second separator 140, the negative-electrode layer 110 and the positive-electrode layer 150 between the upper plate 160 and the lower plate 170.

In addition, as shown in FIG. 2, the manufacturing method further includes the step S4a of pressing the first separator 120 and the negative-electrode layer 110 by a weight of 60~70 Kg, between the step S4 and the step S5.

Figure 3:
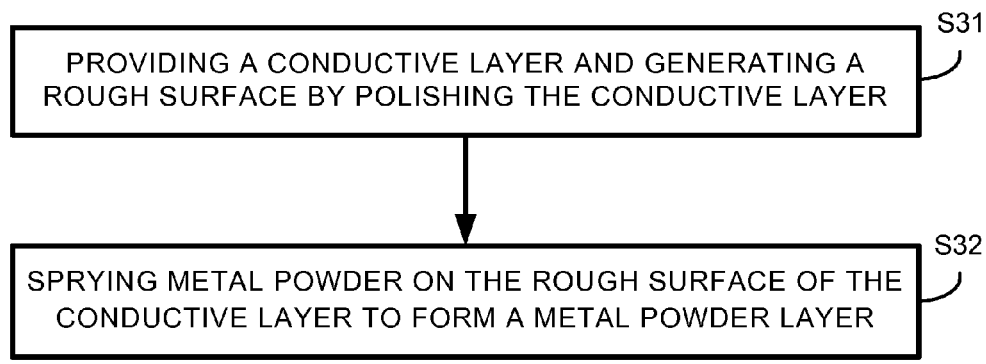
FIG. 3 is a detailed flow chart of step S3 as shown in FIG. 2.

FIG. 3 is a detailed flow chart of the step S3 as shown in FIG. 2. In FIG. 3, the step S3 further includes following steps:

Step S31: providing a conductive layer 111 and generating a rough surface by polishing the conductive layer 111; and
Step S32: spraying metal powder on the rough surface of the conductive layer 111 to form a metal-powder layer.

Figure 4:
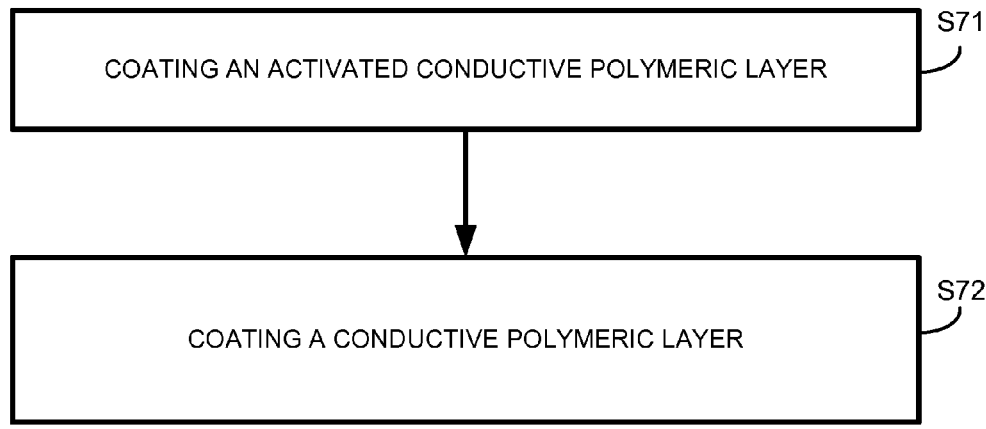
FIG. 4 is a detailed flow chart of step S7 as shown in FIG. 2.

FIG. 4 is a detailed flow chart of the step S7 as shown in FIG. 2. In FIG. 4, the step S7 further includes following steps:

step S71: coating an activated conductive polymeric layer; and
step S72: further coating a conductive polymeric layer.

The flat-plate battery of the present invention can store hydrogen by chlorophyll of the chlorophyll layer and/or chlorophyll of the positive-electrode layer to generate electricity. Namely, during the oxidation-reduction chemical reaction, chlorophyll molecule loses a magnesium ion in its porphyrin center to become the pheophytin molecule. Two empty bonding sites of the latter then trap two hydrogen ions to practically store hydrogen and make the running of current smooth. Furthermore, the manufacturing process of the flat-plate battery is simple and economical, and only natural and non-toxic substances are used. Unlike the manufacturing process of conventional batteries, the manufacturing process of the flat-plate battery of the present invention will not cause environmental pollution even when it is discarded after use.

It should be noted that the terms "first", "second", "third" and other terms in the present invention are only used as textual symbols as the circumstances can require, and thus the practice is not limited to these terms. It should be further noted that these terms can be used interchangeably.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A flat-plate battery, comprising:
   a. a negative-electrode layer;
   b. a first separator, disposed on the negative-electrode layer;
   c. a chlorophyll layer, disposed on the first separator;
   d. a second separator, disposed on the chlorophyll layer;
   e. a positive-electrode layer, disposed on the second separator;
   f. an upper plate; and
   g. a lower plate,
   wherein the negative-electrode layer, the first separator, the chlorophyll layer, the second separator and the positive-electrode layer are sandwiched between the upper plate and the lower plate.

2. The flat-plate battery of claim 1, wherein the negative-electrode layer comprises a conductive layer.

3. The flat-plate battery of claim 2, wherein the conductive layer comprises conductive material, and the conductive material is selected from the group consisting of metal, metallic compound and conductive polymeric material.

4. The flat-plate battery of claim 3, wherein the metal is selected from the group consisting of aluminum and gold, the metallic compound is selected from the group consisting of manganese protoxide, zinc oxide and magnesium oxide, and the conductive polymeric material is heterocycle or aromatic heterocyclic compound and selected from the group consisting of polyacetylene, poly (arylene vinylene), polythiophene, polyaniline, polypyrrole and their derivatives.

5. The flat-plate battery of claim 2, wherein the negative-electrode layer further comprises a metal-powder layer made of metal powder, and the metal-powder layer is formed on the conductive layer.

6. The flat-plate battery of claim 5, wherein the metal powder is selected from the group consisting of group II elements, group III elements and group VII elements, the group II elements are selected from the group consisting of magnesium, calcium and zinc, the group III elements are selected from the group consisting of boron and aluminum, and the group VII elements are selected from the group consisting of manganese and ferrum.

7. The flat-plate battery of claim 1, wherein the first separator and the second separator are both made of high-fiber material, and the high-fiber material is paper material selected from the group consisting of cellophane, cotton paper, rice paper and silk paper.

8. The flat-plate battery of claim 1, wherein at least one of the first separator and the second separator comprises a solution of a salt, and the salt is selected from the group consisting of sodium iodide, sodium chloride and sodium hydroxide.

9. The flat-plate battery of claim 1, wherein the chlorophyll layer comprises chlorophyll.

10. The flat-plate battery of claim 9, wherein the chlorophyll is selected from the group consisting of chlorophyll a, chlorophyll b. chlorophyll c1, chlorophyll c2, chlorophyll d, and chlorophyll e.

11. The flat-plate battery of claim 9, wherein the chlorophyll is in powder form or in liquid form.

12. The flat-plate battery of claim 9, wherein a chlorophyll oxidase has been removed from the chlorophyll.

13. The flat-plate battery of claim 9, wherein the chlorophyll layer further comprises a high polymer.

14. The flat-plate battery of claim 13, wherein the high polymer is high polymer of glucose, and the high polymer of glucose is selected from the group consisting of potato starch, water chestnut starch, corn starch, sweet potato starch, lotus root starch, mustard powder and pueraria powder.

15. The flat-plate battery of claim 9, wherein the chlorophyll layer further comprises calcium carbonate or natural phytochemicals selected from the group consisting of lignans, oligosaccharides, polysaccharides, flavonoids, iridoids, fatty acids, scopoletin, catechin, beta-sitosterol, damnacanthal and alkaloids.

16. The flat-plate battery of claim 1, wherein the positive-electrode layer comprises an activated conductive polymeric layer and a conductive polymeric layer.

17. The flat-plate battery of claim 16, wherein the activated conductive polymeric layer is made of carbon fiber cloth, carbon powder or nano conductive polymeric powder.

18. The flat-plate battery of claim 17, wherein the activated conductive polymeric layer further comprises the chlorophyll in powder form.

19. The flat-plate battery of claim 1, wherein the upper plate and the lower plate are selected from the group consisting of acrylic plates, composite plates, metal plates, electric glass plates, metal-oxidation plates and alloy plates.

20. A flat-plate battery, comprising:
   a negative-electrode layer;
   a first separator, disposed on the negative-electrode layer;
   a chlorophyll layer, disposed on the first separator;
   a second separator, disposed on the chlorophyll layer;
   a positive-electrode layer comprising chlorophyll in powder form, disposed on the second separator;
   an upper plate; and
   a lower plate,
   wherein the negative-electrode layer, the first separator, the chlorophyll layer, the second separator and the positive-electrode layer are sandwiched between the first separator and the second separator.

* * * * *